United States Patent
Gross

(10) Patent No.: US 11,732,896 B2
(45) Date of Patent: *Aug. 22, 2023

(54) MOBILE KITCHEN UNIT

(71) Applicant: Nomad Kitchen Company LLC, Berkeley, CA (US)

(72) Inventor: Samuel Hirscher Gross, Berkeley, CA (US)

(73) Assignee: Nomad Kitchen Company LLC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,763

(22) Filed: Sep. 16, 2022

(65) Prior Publication Data

US 2023/0016644 A1 Jan. 19, 2023

Related U.S. Application Data

(63) Continuation of application No. 16/794,972, filed on Feb. 19, 2020, now Pat. No. 11,466,861.

(Continued)

(51) Int. Cl.
*F24C 3/14* (2021.01)
*A47J 47/16* (2006.01)
(Continued)

(52) U.S. Cl.
CPC ............... *F24C 3/14* (2013.01); *A45F 3/46* (2013.01); *A47B 77/06* (2013.01); *A47J 47/16* (2013.01);
(Continued)

(58) Field of Classification Search
CPC ...... B60P 3/32; A45F 3/46; F24C 3/14; F24C 1/16; F24C 7/10; F24C 3/027; A47B 77/06; A47B 77/02; A47B 77/08; A47B 77/10; A47B 2220/03; A47J 47/16; A47J 47/005; A47J 47/20
See application file for complete search history.

(56) References Cited

U.S. PATENT DOCUMENTS

| 1,478,371 | A | 12/1923 | Albrighton |
| 2,907,316 | A | 10/1959 | Windust |

(Continued)

FOREIGN PATENT DOCUMENTS

| DE | 10307629 | 7/2007 |
| DE | 102006032227 | 1/2008 |

(Continued)

*Primary Examiner* — Patrick D Hawn
(74) *Attorney, Agent, or Firm* — Clayton, McKay & Bailey, PC

(57) ABSTRACT

A mobile kitchen unit includes a storage container, a first module, and a second module. The first module can include a sink for receiving water. The first module can be positioned within the storage container and mounted on a first set of rails such that it can slide at least partially out from the storage container. The second module can have a stove and propane tank in one example. The second module can be positioned within the first module and mounted on a second set of rails such that the second module can slide at least partially out from the first module. In one example, the first and second modules are independently slidable with respect to one another. In an example, the second module can fit substantially within the first module with the stove and propane tank still attached to the second module.

20 Claims, 5 Drawing Sheets

Related U.S. Application Data

(60) Provisional application No. 62/808,064, filed on Feb. 20, 2019.

(51) Int. Cl.
  *A47B 77/06* (2006.01)
  *A45F 3/46* (2006.01)
  *F24C 3/02* (2021.01)
  *A47J 47/00* (2006.01)
  *A47J 47/20* (2019.01)

(52) U.S. Cl.
  CPC ............. *F24C 3/027* (2013.01); *A47J 47/005* (2013.01); *A47J 47/20* (2013.01)

(56) References Cited

U.S. PATENT DOCUMENTS

| | | | |
|---|---|---|---|
| 2,944,862 A | 7/1960 | Theodore |
| 3,289,664 A | 12/1966 | Hewitt |
| 3,544,152 A | 12/1970 | Low |
| 3,866,994 A | 2/1975 | Bonin |
| 3,888,539 A | 6/1975 | Niessner |
| 3,915,529 A | 10/1975 | Bernier |
| 3,949,902 A | 4/1976 | Thompson |
| 4,051,837 A | 10/1977 | Norman |
| 4,082,391 A | 4/1978 | Turner |
| 4,295,678 A | 10/1981 | Morris |
| 4,375,306 A | 3/1983 | Linder |
| 4,893,885 A | 1/1990 | Borello |
| 5,862,540 A | 1/1999 | Chuan |
| 5,921,229 A | 7/1999 | Blake |
| 6,079,400 A | 6/2000 | Tomat Dany |
| 6,213,265 B1 | 4/2001 | Wang |
| 6,543,436 B2 | 4/2003 | Montgomery |
| 6,814,383 B2 | 11/2004 | Reed, III |
| 6,836,910 B2 | 1/2005 | Cawthon |
| 6,883,881 B2 | 4/2005 | Gauss |
| 6,915,797 B1 | 7/2005 | Lightbourne |
| 6,929,190 B1 | 8/2005 | Adrian |
| 7,121,274 B2 | 10/2006 | Wishart |
| 7,407,210 B2 | 8/2008 | Arbaugh |
| 7,533,917 B2 | 5/2009 | Tong |
| 7,901,018 B2 | 3/2011 | Baughman |
| 8,424,128 B2 | 4/2013 | Dvorak |
| 9,089,210 B2 | 7/2015 | Kool |
| 9,435,546 B2 | 9/2016 | Galatte |
| 9,822,982 B2 | 11/2017 | Babington |
| 10,005,480 B2 | 6/2018 | Grappe |
| 10,174,952 B1 | 1/2019 | King |
| 10,458,658 B1 | 10/2019 | Bradfield |
| 2012/0204343 A1 | 8/2012 | Shollmier |
| 2020/0263876 A1 | 8/2020 | Gross |

FOREIGN PATENT DOCUMENTS

| | | |
|---|---|---|
| DE | 202008004255 | 8/2008 |
| DE | 202016107218 | 3/2018 |
| DE | 202019106553 | 2/2020 |
| FR | 2655249 | 6/1991 |
| KR | 20170054810 | 5/2017 |

MOBILE KITCHEN UNIT

BACKGROUND

When traveling without access to restaurants, hotels, or home, a mobile kitchen can provide a user with means for preparing and/or cleaning up after meals. For example, a mobile kitchen unit can be carried in a vehicle and set up at a campsite or in the vehicle itself.

Previous mobile kitchens have various drawbacks that limit their utility. For example, they can be too large or heavy to fit within certain passenger vehicles. Those that do fit in a vehicle are typically still heavy or otherwise difficult to remove and set up. Some mobile kitchen units require external support legs that contact the ground and thereby take up additional space. Some units require difficult installation processes that are difficult to reverse, such as by bolting the unit into a vehicle using fasteners that require tools. Various other drawbacks exist in the art.

As a result, a need exists for a mobile kitchen unit that is lightweight; easy to secure, use, or remove without tools; is height adjustable; does not block sight lines of a driver; does not require support legs or electricity; can easily set up and lock in place; and provides sufficient kitchen functionality for a user.

SUMMARY

Examples described herein include systems and methods directed toward a mobile kitchen unit that accomplished the goals laid out above.

In one example, a mobile kitchen unit is provided and includes a storage container, a first module, and a second module. The first module can include a sink for receiving water. The first module can be constructed such that it can be positioned within the storage container and mounted on a first set of rails such that it can slide at least partially out from the storage container. The second module can have a stove and propane tank in one example. The second module can be positioned within the first module and mounted on a second set of rails such that the second module can slide at least partially out from the first module. In one example, the first and second modules are independently slidable with respect to one another. In an example, the second module can fit substantially within the first module with the stove and propane tank still attached to the second module.

In one example, the mobile kitchen unit includes at least two retention straps, each strap mounted to a top surface of the storage container and a respective side surface of the storage container and configured to additionally mount to respective vehicle mounting points adjacent to each side surface of the storage container. The at least two retention straps can be mounted to the respective side surfaces at locations adjacent to a bottom surface of the storage container. The straps can be adjustable via a ratcheting mechanism, for example. In some examples, the mobile kitchen unit can be mounted to a vehicle using only two straps, with one on each side. In another example, the mobile kitchen unit can be mounted to a vehicle using three straps, with one on side and one on the rear.

In one example, the storage container can include at least one leveling mechanism for leveling the storage container when it is mounted in a vehicle. In one example, each of the first and second modules have independent locks that prevent the respective module from sliding along the respective set of rails.

In an example, the first module includes a cutting board positioned over basket, and wherein both the cutting board and basket are oriented such that they reside within the storage container when the first module is in a closed position. In one example, when the first and second modules are in a closed position within the storage container, the sink of the first module is positioned above the stove of the second module.

The examples summarized above can each be incorporated into a method for providing a mobile kitchen unit as described herein. Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
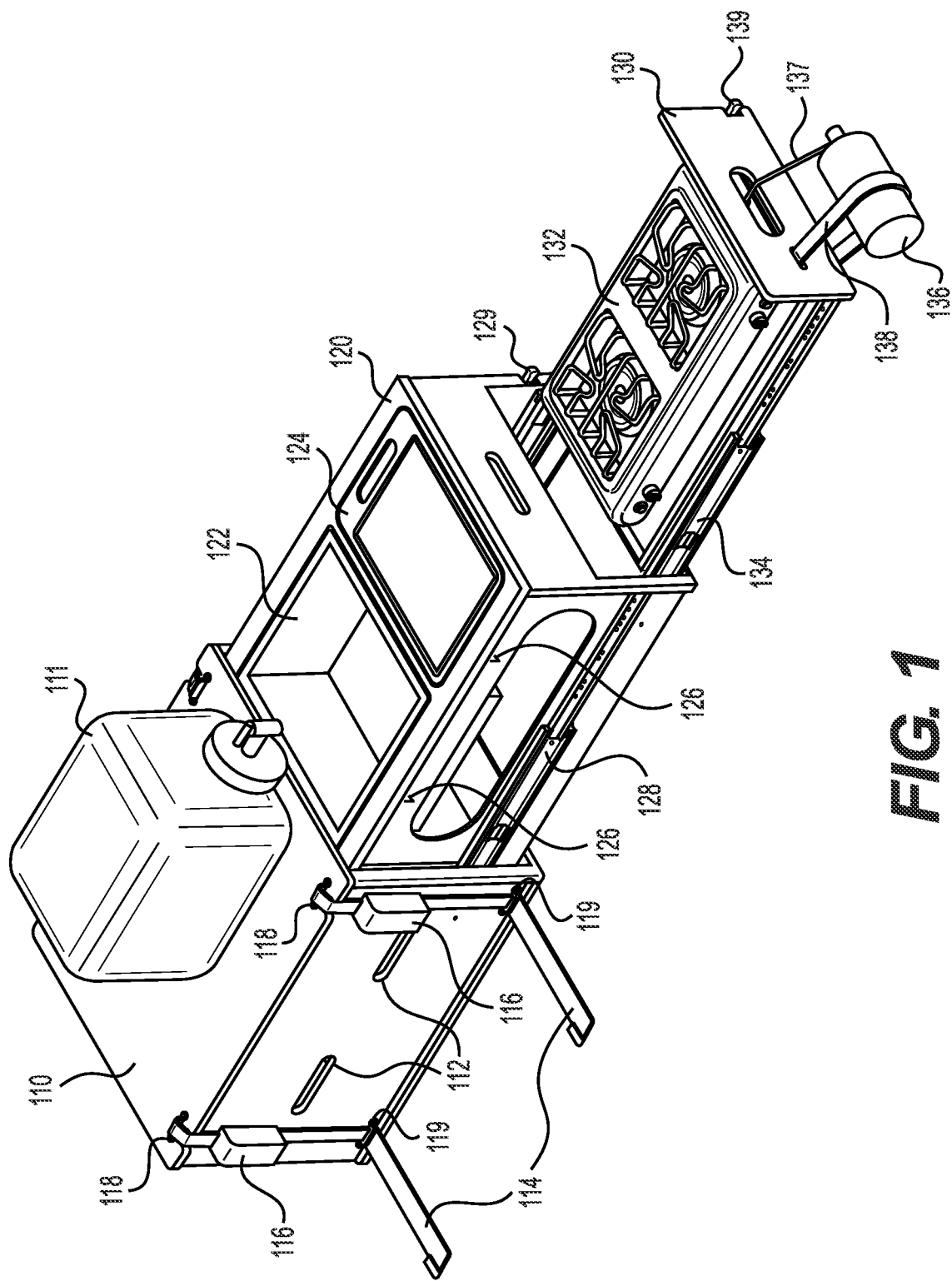
FIG. 1 is an illustration of an example mobile kitchen unit as described herein in an expanded configuration.

FIG. 1 provides an illustration of an example mobile kitchen unit as described herein in an expanded configuration. The mobile kitchen unit can include three main components: a storage container 110, a first module 120 that fits within the storage container 110, and a second module 130 that fits within the first module 120. The first module 120 can be mounted on a first set of rails 128. The first set of rails 128 can include hardware mounted to the first module 120 as well as hardware mounted to the storage container 110, and the two sets of hardware can function together as a slide mechanism similar to a kitchen drawer. For example, the hardware can be metal, wood, or plastic that is mounted via screws or other known fastener types.

The second module 130 can similarly fit within the first module 120 using a second set of rails 134. For example, the second set of rails 134 can include hardware mounted to the second module 130 as well as hardware mounted to the first module 120, and the two sets of hardware can function together as a slide mechanism. In some examples, the second set of rails 134 can interface with the first set of rails 128. In some examples, the rails may be mounted to the bottom of the modules.

Figure 2:
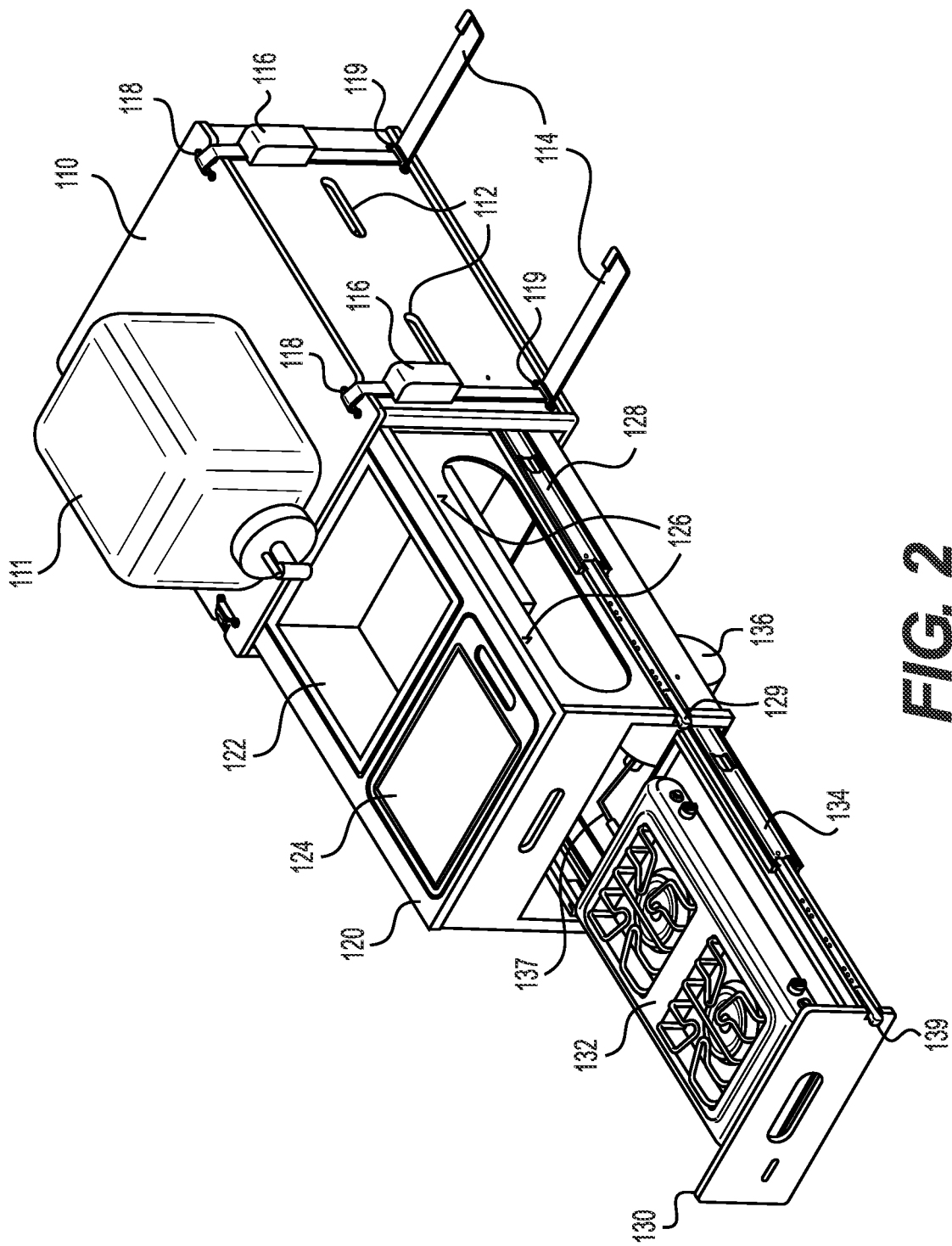
FIG. 2 is an illustration of an example mobile kitchen unit as described herein in an expanded configuration.
Figure 3:
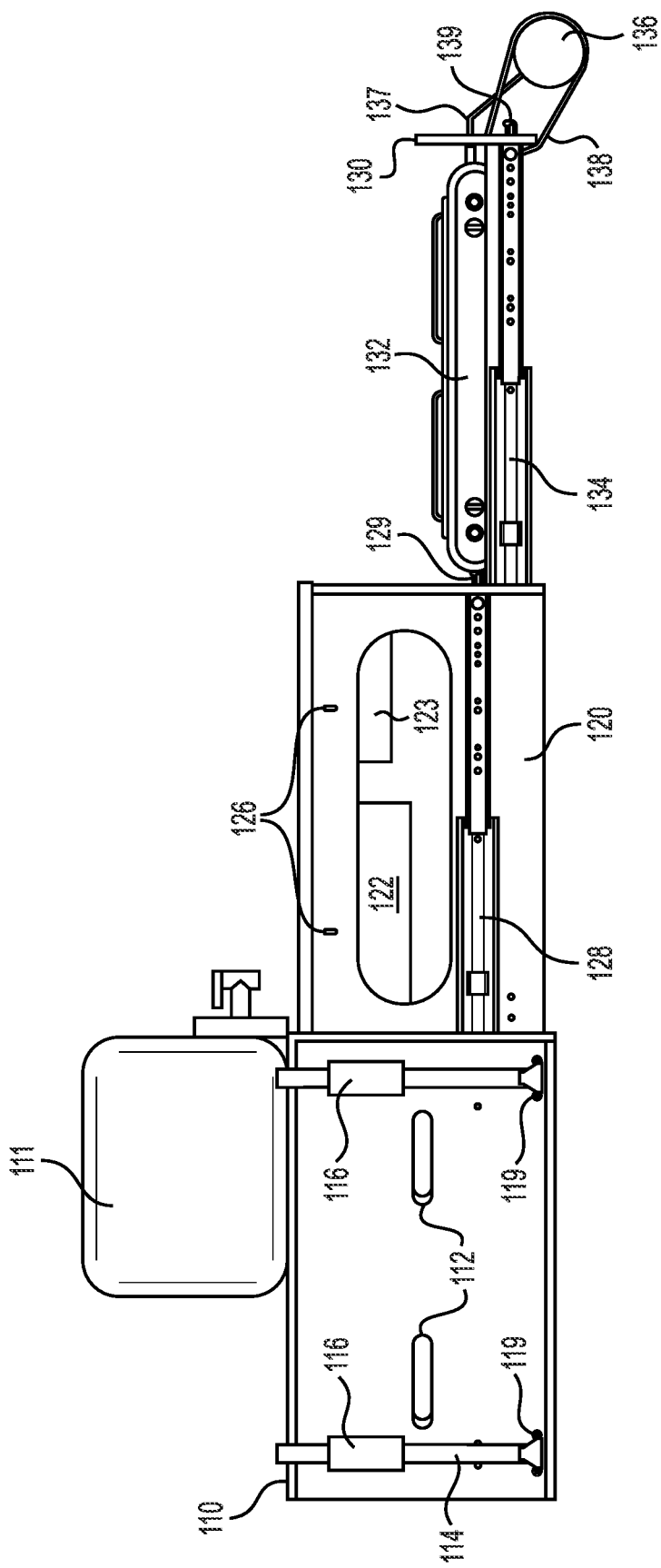
FIG. 3 is an illustration of a side view of an example mobile kitchen unit as described herein in an expanded configuration.
Figure 4:
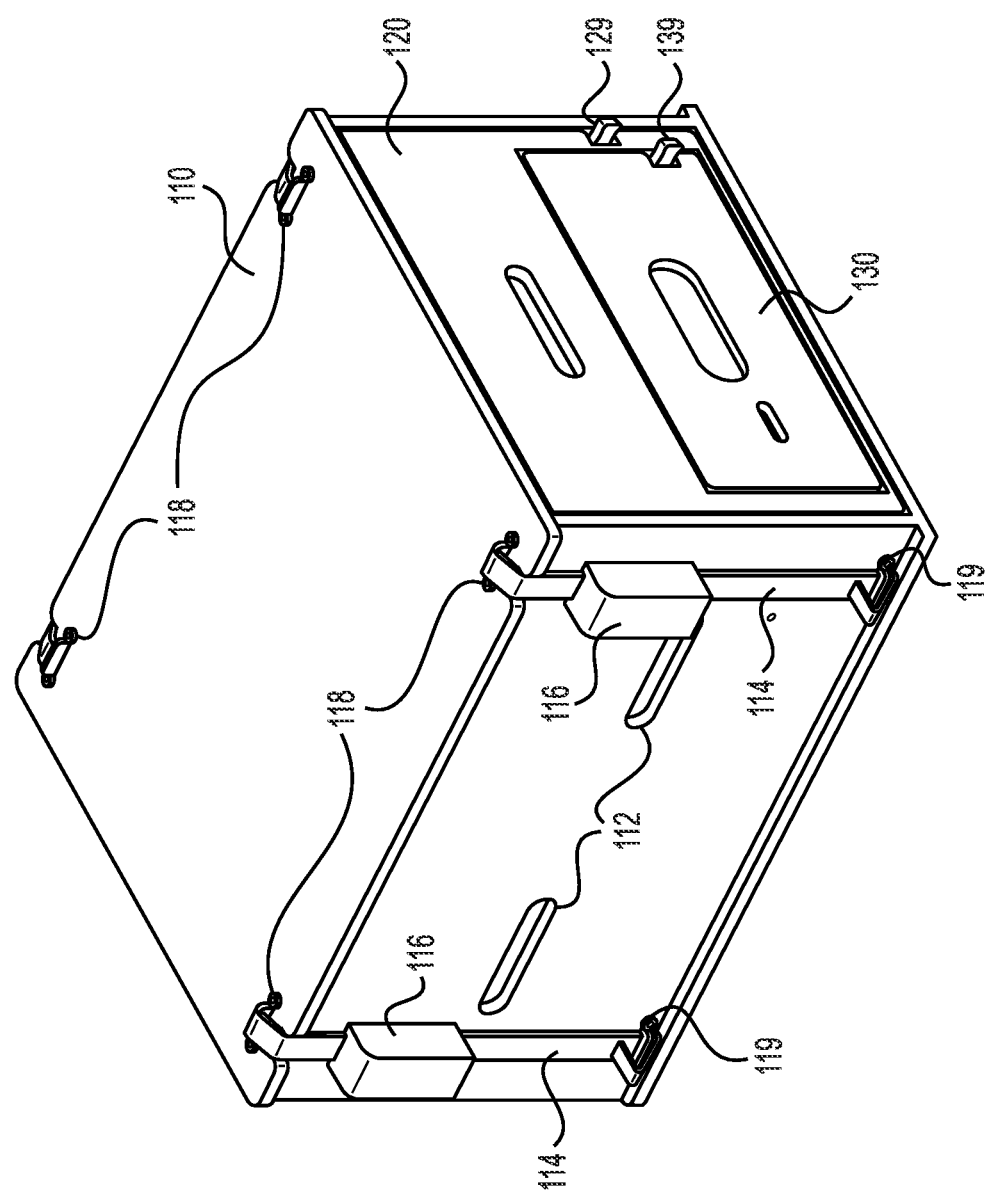
FIG. 4 is an illustration of an example mobile kitchen unit as described herein in a collapsed configuration.

Each of the first and second modules 120, 130 can move independently. That is to say, the first module 120 can slide out from the storage container 110 and slide back into the storage container 110 regardless of the orientation of the second module 130. Similarly, the second module 130 can slide out from the first module 120 and slide back into the first module 120 regardless of the orientation of the first module 120. FIGS. 1-3 show the mobile kitchen unit with both the first and second modules 120, 130 extended, while FIG. 4 shows the mobile kitchen unit with both the first and second modules 120, 130 retracted. However, two additional configurations are possible: (1) the first module 120 extended with the second module 130 retracted within it, and (2) the second module 130 extended from the first module 120 while the first module 120 remains retracted within the storage container 110.

The first and second modules 120, 130 can each independently lock into place with respect to the slide mechanisms 128, 134. For example, the first module 120 can include a first lock 129 that prevents the first module 120 from sliding along the slide mechanism 128. The first lock 129 can therefore allow a user to lock the first module 120 such that it stays within the storage container 110, if the lock 129 is applied when the first module 120 is in a closed position. It can also allow a user to lock the first module 120 such that it stays in an extended position with respect to the storage container 110. In some examples, the locking mechanisms may be located on the face of the modules or by a simple block or pinion to prevent movement.

Similarly, a second lock 139 can prevent the second module 130 from sliding along the slide mechanism 134 regardless of the orientation of the second module 130 with respect to the first module 120. These locks 129, 139 can be positioned such that they are accessible from the outside of the mobile kitchen unit, regardless of the positions of the first and second modules 120, 130, as shown in FIGS. 1-5.

While the locks 129, 139 are shown as tabs, they can be provided in any form. For example, the locks can be knobs, handles, pins, or any other variation of a locking mechanism.

The storage container 110 can include various mechanisms for mounting the mobile kitchen unit to a vehicle, table, or any other suitable surface. For example, FIG. 1 shows a first set of mounting hardware 118 and a second set of mounting hardware 119. In this example, the first set of mounting hardware are disposed on a top surface of the storage container 110. However, they can be placed on other surfaces. Similarly, the second set of mounting hardware 119 are shown mounted to a side surface of the storage container, proximate the lower surface of the storage container 110.

The mounting hardware 118, 119 can be utilized to attach one or more securing straps 114 to the storage container 110. In one example, the straps 114 are ratcheting straps having a ratchet mechanism 116 that can be used to tighten the straps. Any other type of strap 114 can be used, and although the word "strap" is used in this description, the strap can be a chain, wire, turnbuckle, or any securing mechanism that can interface with any form of mounting hardware or attachment point 118, 119. The straps 114 can interface with the hooks 118 via additional mounting hardware or by simply being threaded through the mounting hardware and secured.

The free end of the straps 114 can be extended outward from the storage container 110 such that they may be secured to another object, such as a mounting point within a vehicle. Because the lower mounting hardware 119 are disposed near the lower surface of the storage container 110, the straps 114 can be extended outward along the floor of the vehicle. This allows for other cargo to be placed on top of the straps 114 without compromising the security of the storage container 110. Although FIG. 1 shows two straps 114 and associated mounting hardware 118, 119, any number of straps 114 and mounting hardware 118, 119 may be utilized. For example, FIG. 2 shows that the other side of the storage container 110 can include a matching set of each. The storage container 110 can further include slots 112 that allow a user to grip the storage container 110 and move it easily from one location to another.

The straps 114 can include hooks at their free ends for connecting to a vehicle. For example, the hooks of the straps 114 can interface with a mounting point in the cargo area of a vehicle. In some examples, the straps 114 include mounting mechanisms that are not hooks, such as carabiners.

The first module 120 can include a variety of components. In the example of FIG. 1, the first module 120 includes a wash basin 122, also referred to herein as a sink, that can hold liquid without spilling it below. The wash basin 122 can be removable for easy cleaning and dumping of liquid within. The addition of a drainage system may be incorporated to allow liquid to exit the wash basin 122. A water storage container 111 can be placed on top of the storage container 110, providing a source of water to the wash basin 122. A water storage container 111 can also be incorporated within the storage container 110 or the first module 120.

The first module 120 can also include a cutting board 124 that is removably seated within a frame of the first module 120. The cutting board 124 can be removed to reveal a basket 123 that is shown in FIG. 3. The basket can be a wire mesh basket, for example, providing straining and/or storage capabilities. The first or second module 120, 130 can also include other features such as accessory hangers or hooks 126. These or other forms may be used to secure and provide space for accessories such as a spice rack or waste basket/bag or other.

The second module 130 can include a stove unit 132 with at least one burner. In this example, the stove unit 132 is a propane stove with two burners. For example, a propane tank 136 can be mounted to the second module 130 such that it moves with the second module 130 regardless of the second module's 130 position with respect to the first module 120. In this example, an elastic strap 138 is used to secure the propane tank 136 to the second module 130, extending though a slot in the face of the second module 130. However, any type of retention device can be used to mount the propane tank 136. FIGS. 1-3 also show a propane line 137 that supplies fuel to the stove unit 132.

As shown in FIG. 2, the stove unit 132 can be oriented in more than one position. The example of FIG. 2 shows the stove unit 132 turned such that the propane tank 136 is positioned under the first module 120, rather than extending from the opposite side of the second module 130. In some examples, the propane tank 136 can remain attached, in either position, to the second module 130 regardless of the positions of the first and second modules 120, 130.

Figure 5:
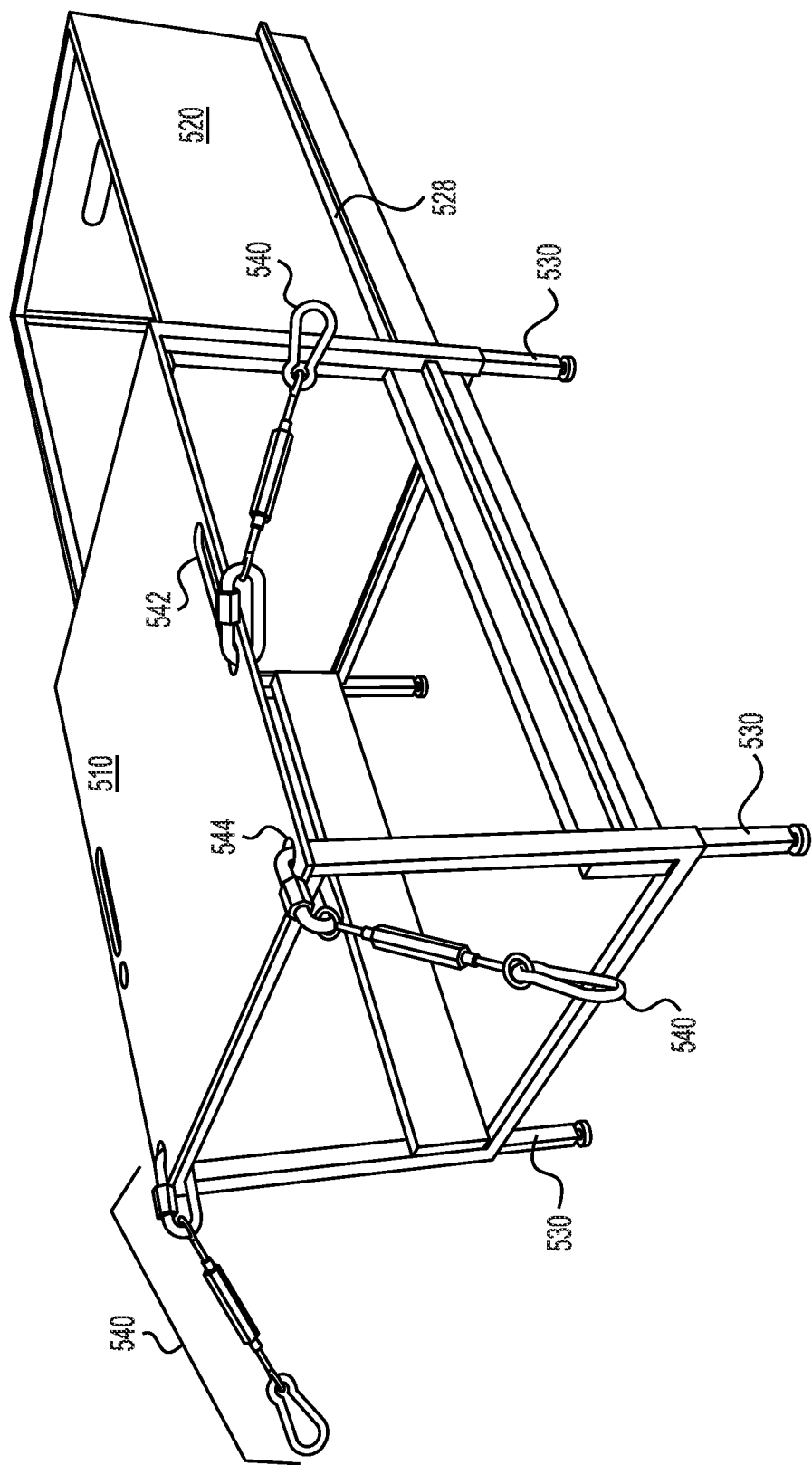
FIG. 5 is an illustration of an example mobile kitchen unit having height-adjustable legs and alternative restraint devices.

The mobile kitchen unit can include a height-adjustment feature that interfaces with the storage container 110 portion of the unit. The height-adjustment feature can include one or more of levelers, adjustable legs, or riser inserts. FIG. 5 shows an example of adjustable legs 530 disposed on each corner of an example storage container 510. FIG. 5 is intended to show certain optional features, and as such does not include certain details from FIGS. 1-4 such as a wash basin or stove unit. However, the same modules 120, 130 and their associated features can be incorporated into the unit shown in FIG. 5. For example, the first module 520 and first slide mechanism 528 of FIG. 5 can correspond to the first module 120 and first slide mechanism 128 of FIGS. 1-4, described above.

The adjustable legs 530 shown in FIG. 5 can be adjusted by, for example, sliding the legs into or out from the body of the storage container 510. In another example, the adjustable legs 530 can include screw pads that, when rotated, extend or retract from the legs, providing finer adjustment capabilities.

The adjustable legs 530 of FIG. 5 can be incorporated into the unit of FIGS. 1-4. Other height-adjustable mechanisms can be used as well. For example, a leveling block can be placed underneath the storage container 110, 510 such that it raises the container 110, 510 to allow for a clear path to extend the first module 120, 520. In another example, separate leveling blocks can be placed underneath the corners of the storage container 110, 510 to achieve a similar result. The system can be stored with the height-adjustable mechanisms in any desired position.

FIG. 5 also shows attachment mechanisms 540 that can be substituted for the straps discussed with respect to FIGS. 1-4. The mechanisms 540 shown in FIG. 5 can include, for example, carabiners and turnbuckles, the length of which can be adjusted as needed. In the example of FIG. 5, the carabiners can be attached through holes 544 or slots 542 in the storage container 510, which fill the same role as mounting hardware 118, 119 and associated straps 114 in FIG. 1-4.

Although not pictured, multiple variations of the mobile kitchen unit are possible using the teachings and disclosures herein. For example, the stove, wash basin, basket, and cutting board can be placed within a single module using a single set of rails. In this embodiment, the single module can be longer than the modules depicted in the drawings, to accommodate the additional components. Another variation may be possible without rails if all components can be directly placed in and accessed from the storage container.

In some examples, one or more sides of the storage container or modules can be omitted, such that a user can see within the modules or container. For example, the front face of each module could be omitted.

The dimensions of the mobile kitchen unit can be modified as desired. For example, the height, length, and depth of the mobile kitchen unit can be constructed larger or smaller to provide more or fewer components within, respectively. In an example where the unit is taller or wider, an additional storage drawer can be added above, below, or to the side of the modules. The additional storage drawer can include a cooler, refrigerator, or simply function as a storage container. In an example where the unit is smaller, the stove can be a one-burner unit.

The orientation of the modules with respect to the storage container can also be modified from the examples described above. For example, the modules can extend from a side of the storage container rather than from the front face.

Additionally, any combination of components and modules described herein can be utilized with the mobile storage kitchen. For example, a module can be provided to have a stove but no sink, a sink but no cutting board, or any combination thereof.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A mobile kitchen unit, comprising:
a storage container;
a first module having at least one of a sink for receiving water and a surface shaped to house a stove, the first module positioned within the storage container and mounted on a first set of rails such that the first module can slide at least partially out from the storage container; and
a second module having at least one of the sink and the surface, the second module positioned within the first module and mounted on a second set of rails such that the second module can slide at least partially out from the first module,
wherein the first and second modules are independently slidable with respect to one another, and
wherein the second module can fit substantially within the first module.

2. The mobile kitchen unit of claim 1, further comprising a retention device removably mounted to a second surface of the storage container and configured to additionally mount to a vehicle mounting point.

3. The mobile kitchen unit of claim 1, further comprising at least one anchor mounted to a second surface of the storage container, the anchor configured to receive a retention device.

4. The mobile kitchen unit of claim 1, wherein at least one of the first and second modules includes at least one of: an oven, a refrigerator, a cooler, a cutting board, a countertop, a storage basket, and a storage area.

5. The mobile kitchen unit of claim 1, wherein when the storage container is mounted to a vehicle, the first and second modules can slide out of the storage container and be operable without requiring support against the ground.

6. The mobile kitchen unit of claim 1, wherein the storage container comprises at least one leveling mechanism for leveling the storage container.

7. The mobile kitchen unit of claim 1, wherein each of the first and second modules have independent locks that prevent the respective module from sliding along the respective set of rails.

8. The mobile kitchen unit of claim 1, wherein at least one of the first and second modules further comprises a storage drawer.

9. The mobile kitchen unit of claim 1, wherein when the first and second modules are in a closed position within the storage container, the sink is positioned above the surface.

10. The mobile kitchen unit of claim 2, wherein the retention device includes at least one of a strap, a turnbuckle, a ratchet strap, and a bungee cord.

11. The mobile kitchen unit of claim 1, further comprising a retention device for securing fuel associated with a stove.

12. A method for providing a mobile kitchen unit, the method comprising:
providing a storage container;
providing a first module having at least one of a sink for receiving water and a surface shaped to house a stove, the first module positioned within the storage container and mounted on a first set of rails such that the first module can slide at least partially out from the storage container; and
providing a second module having at least one of the sink and the surface, the second module positioned within the first module and mounted on a second set of rails such that the second module can slide at least partially out from the first module, wherein the first and second modules are independently slidable with respect to one another, and wherein the second module can fit substantially within the first module.

13. The method of claim 12, further comprising a retention device removably mounted to a second surface of the storage container and configured to additionally mount to a vehicle mounting point.

14. The method of claim 12, further comprising at least one anchor mounted to a second surface of the storage container, the anchor configured to receive a retention device.

15. The method of claim 12, wherein at least one of the first and second modules includes at least one of: an oven, a refrigerator, a cooler, a cutting board, a countertop, a storage basket, and a storage area.

16. The method of claim 12, wherein when the storage container is mounted to a vehicle, the first and second modules can slide out of the storage container and be operable without requiring support against the ground.

17. The method of claim 12, wherein the storage container comprises at least one leveling mechanism for leveling the storage container.

18. The method of claim 12, wherein each of the first and second modules have independent locks that prevent the respective module from sliding along the respective set of rails.

19. The method of claim 12, wherein at least one of the first and second modules further comprises a storage drawer.

20. The method of claim 12, wherein when the first and second modules are in a closed position within the storage container, the sink is positioned above the surface.

* * * * *